US008291867B2

(12) United States Patent
Blizzard

(10) Patent No.: US 8,291,867 B2
(45) Date of Patent: Oct. 23, 2012

(54) PRESSURE-APPLYING GARMENT FOR ANIMALS

(75) Inventor: Philip J. Blizzard, Durham, NC (US)

(73) Assignee: Thundershirt, LLC, Durham, NC (US)

(*) Notice: Subject to any disclaimer, the term of this patent is extended or adjusted under 35 U.S.C. 154(b) by 60 days.

(21) Appl. No.: 12/769,735

(22) Filed: Apr. 29, 2010

(65) Prior Publication Data

US 2010/0319632 A1 Dec. 23, 2010

Related U.S. Application Data

(60) Provisional application No. 61/218,620, filed on Jun. 19, 2009.

(51) Int. Cl.
*A01K 13/00* (2006.01)

(52) U.S. Cl. .................................................. 119/850

(58) Field of Classification Search .................. 119/850, 119/856, 863, 865; 2/69.5; 602/75, 76; 54/79.1, 54/79.2, 79.4
See application file for complete search history.

(56) References Cited

U.S. PATENT DOCUMENTS

| 5,632,235 | A | * | 5/1997 | Larsen et al. | 119/856 |
| 5,996,537 | A | * | 12/1999 | Caditz | 119/850 |
| 6,123,049 | A | * | 9/2000 | Slater | 119/850 |
| 6,234,117 | B1 | | 5/2001 | Spatt | |
| D470,275 | S | * | 2/2003 | Lidis | D30/145 |
| 6,662,754 | B1 | | 12/2003 | Wilson | |
| 6,820,574 | B2 | | 11/2004 | Sharpe | |
| 7,121,231 | B2 | * | 10/2006 | Benefiel | 119/850 |
| 7,131,399 | B2 | * | 11/2006 | Blommel | 119/712 |
| 7,131,400 | B2 | * | 11/2006 | Wanveer et al. | 119/792 |
| 2003/0079695 | A1 | | 5/2003 | Kerrigan | |
| 2008/0067163 | A1 | | 3/2008 | Axinte et al. | |
| 2008/0121192 | A1 | | 5/2008 | Moy | |
| 2008/0276880 | A1 | * | 11/2008 | Swisher et al. | 119/728 |
| 2009/0120377 | A1 | | 5/2009 | Palmer | |
| 2009/0178628 | A1 | * | 7/2009 | Carmean et al. | 119/850 |
| 2011/0231993 | A1 | * | 9/2011 | Schmid et al. | 5/494 |

FOREIGN PATENT DOCUMENTS

EP 1366658 A1 * 12/2003
JP 2008178332 A * 8/2008

OTHER PUBLICATIONS

Machine tranlsation of JP 2008178332 to Ito, published Aug. 2008.*
Paws Aboard Inc., Paws Aboard Doggy Life Jacket and Designed Doggy Life Jackets, http://www.pawsaboard.com/dog-lifejacket-pet-life-jacket.asp, visited Jan. 30, 2009, 3 pages.
Thundershirt, LLC, International Application No. PCT/US2010/038501, International Search Report and Written Opinion, Mar. 22, 2011, 13 pages.
Thundershirt, LLC, International Application No. PCT/US2010/038501, International Preliminary Report on Patentability and Written Opinion, Jan. 5, 2012, 6 pages.

* cited by examiner

*Primary Examiner* — Rob Swiatek
*Assistant Examiner* — Kathleen Iwasaki
(74) *Attorney, Agent, or Firm* — Moore & Van Allen PLLC; Matthew W. Witsil; Michael G. Johnston

(57) ABSTRACT

A garment to reduce an animal's anxiety, fearfulness, over-excitement, or a combination thereof. The garment may include a central portion, flaps extending from opposite sides of the central portion, and, in some cases, a cinching member that extends from a central area of the central portion. The flaps may be fastened together around the chest and stomach of the animal, and the cinching member may be fastened to the central portion or one or more flaps to tighten the garment further, applying pressure to reduce anxiety, fearfulness, or over-excitement. Straps may be provided to secure the garment to the animal's neck. One material that may be used in making the garment is a fabric made of 55% cotton, 35% polyester, and 10% spandex. The animal may generally be any animal with four legs, for example, a dog or cat, or two arms and two legs, for example, a monkey.

16 Claims, 7 Drawing Sheets

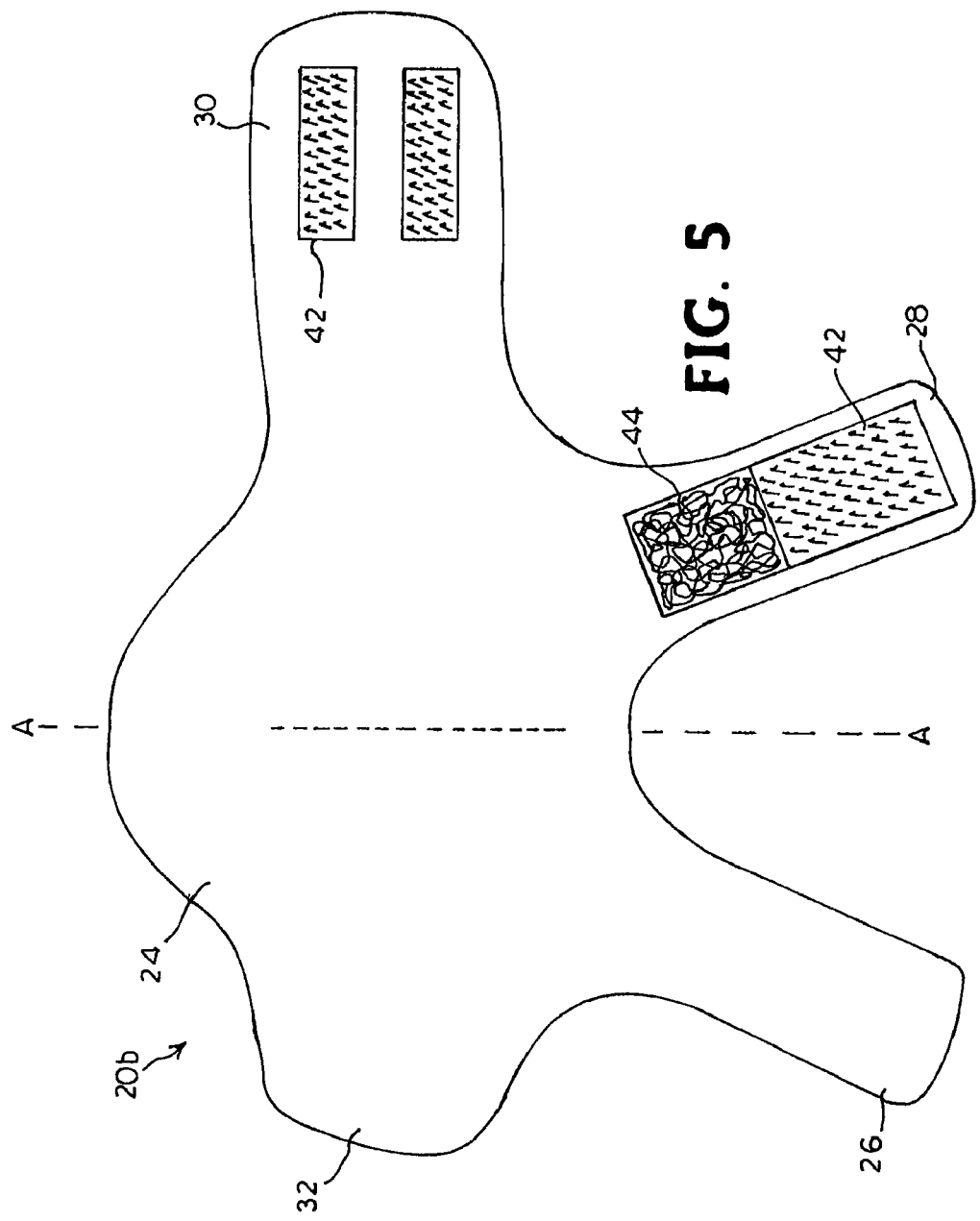

PRESSURE-APPLYING GARMENT FOR ANIMALS

CROSS-REFERENCE TO RELATED APPLICATION

This application claims the benefit of U.S. Provisional Application No. 61/218,620, filed Jun. 19, 2009, the contents of which are hereby incorporated by reference in their entirety.

BACKGROUND

Animals may suffer from various types of anxiety, fearfulness, or overexcitement. Such feelings or behaviors are common problems for dogs, for example, and can present many symptoms and severity levels. On the less extreme end of the spectrum, a fear of thunder may cause the dog to shake and cling to her owner. On the other extreme, the fear may cause panicked running, destructive chewing, defecating indoors, seizures, or other erratic behavior. Additional known symptoms include panting, drooling, whining, barking, hiding, seeking tight spaces, trembling, scratching, not eating, and pacing. Some owners are not aware that negative behavior they are seeing is actually caused by anxiety. In addition to noises, other sources of anxiety may include separation from owner(s), travel, crating, strangers, other dogs, and much more.

Determining what causes a dog's anxiety may be difficult or impossible to pinpoint. The start of the anxiety may in some cases be traced to a traumatic incident such as being too close to a fireworks show or too close to a lightning strike and the subsequent thunder clap. However, a dog may have a genetic predisposition for noise or other types of anxiety. Studies have shown that some breeds, such as Collies, Golden Retrievers, and German Shepherds, have a higher incidence of noise anxiety. For some dogs, noise anxiety gradually appears and worsens as they age for no apparent reason, while for others, noise anxiety appears as a puppy and stays with them.

There are several known treatments to consider for giving relief to a dog from anxiety. For example, for noise anxiety, the owner may change the dog's environment with "common sense" attempts to give the dog comfort. Efforts may include creating a safe haven for the dog, such as a blanket-covered crate, finding a location that will reduce the noise level, or turning on music or the television to help mask the sound of the problem noise. These efforts, however, typically do not show dramatic results, but they can help to reduce symptoms.

A second treatment approach is behavior modification. For example, desensitization is one of the most common behavior modifications tried for noise anxiety. In a controlled environment, the dog is exposed to a low level of the noise. As she becomes accustomed to the noise, the volume is increased over time until she learns to tolerate a high level of noise. This approach has limitations in practice; it is very time consuming, in some cases it is not effective because many dogs recognize the difference between artificial and real events, and if it is effective, the dog will likely require ongoing periodic treatments.

A third treatment approach is medication. There are a variety of prescription medications that a veterinarian may suggest. Some are administered on a regular basis for the life of the dog (Paroxetine or Fluoxetine), while others are given only at the time of an anxiety event (valium). Sometimes a combination of drugs is used. Any of these options tend to be relatively expensive when accounting for the veterinarian visits and the drug costs, and the medications pose a risk of unwanted physical side effects that may be severe.

A final form of treatment is a "pressure wrap." A pressure wrap is material that wraps around the dog's torso, in particular the chest and sometimes the stomach, to provide a constant, gentle pressure. It is uncertain why wraps are effective, but anxiety experts such as Dr. Temple Grandin suggest that pressure has a calming effect on the nervous system. Examples of using pressure to calm anxiety include pressure shirts for people with autism, squeeze chutes for cattle, pressure shirts and weighted vests for children with certain behavioral disorders, and swaddling infants. This treatment has been proven very effective for many dogs. Some wraps are homemade, for example, out of an appropriately sized t-shirt, but wraps can be difficult to put on and get the desired fit. Some conventional pressure wraps lack ease in applying the wrap and may be difficult to adjust to the right pressure.

SUMMARY

In accordance with one embodiment, a garment is provided for an animal having a first pair of appendages and a second pair of appendages, and further having a mid-body between the first pair of appendages and the second pair of appendages. The garment includes a central portion, a first flap, and a second flap. The central portion has a longitudinal axis and a front end, a first side extending laterally in a first direction from the longitudinal axis, and a second side extending laterally in a second direction from the longitudinal axis in a direction opposite the first direction. The first flap extends from the first side of the central portion, and the second flap extends from the second side of the central portion. The flaps are adapted to extend around the animal's mid-body and fasten to each other such that the central portion and fastened flaps form a shape conforming to the outside of the animal's mid-body, and the garment applies pressure to the animal adequate to reduce anxiety, fearfulness, overexcitement, or a combination thereof in the animal.

An embodiment may further provide that the central portion has a front end adapted to be positioned proximate to the head of the animal, and a rear end opposite the front end. A pair of straps may extend from the front end of the central portion in spaced relation, and the straps may be adapted to extend around the animal's neck and fasten to each other.

In accordance with another embodiment, a garment is provided for an animal having a first pair of appendages and a second pair of appendages, and further having a mid-body between the first pair of appendages and the second pair of appendages. The garment includes a central portion, a first flap, a second flap, and a cinching member. The central portion has a longitudinal axis and a front end, a first side extending laterally in a first direction from the longitudinal axis, and a second side extending laterally in a second direction from the longitudinal axis in a direction opposite the first direction. The first flap extends from the first side of the central portion, and the second flap extends from the second side of the central portion. The cinching member has a proximate end attached to the central portion, the first flap, or the second flap and extending to a free distal end. The flaps are adapted to extend around the animal's mid-body and fasten to each other such that the central portion and fastened flaps form a shape conforming to the outside of the animal's mid-body to form a sleeve. The cinching member is adapted to extend at least partially around the sleeve and to fasten to the central portion, the first flap, the second flap, or a combination thereof to further tighten the garment to apply pressure to the animal.

In accordance with another embodiment, a garment is provided for an animal having a first pair of appendages and a second pair of appendages, and further having a mid-body between the first pair of appendages and the second pair of appendages. The garment includes a central portion, a first flap, and a second flap. The central portion has a longitudinal axis and a front end, a first side extending laterally in a first direction from the longitudinal axis, and a second side extending laterally in a second direction from the longitudinal axis in a direction opposite the first direction. The first flap extends from the first side of the central portion, and the second flap extends from the second side of the central portion. The flaps are adapted to extend around the animal's mid-body and fasten to each other such that the central portion and fastened flaps form a shape conforming to the outside of the animal's mid-body. The central portion, the first flap, and the second flap are made of a fabric including approximately from 5% to 25% spandex to apply resilient pressure to the animal.

In accordance with another embodiment, a garment is provided for an animal having a first pair of appendages and a second pair of appendages, and further having a mid-body between the first pair of appendages and the second pair of appendages. The garment includes a central portion that has a longitudinal axis and a front end, a first side extending laterally in a first direction from the longitudinal axis, and a second side extending laterally in a second direction from the longitudinal axis in a direction opposite the first direction. Means for operatively connecting the first side and second side of the central portion together around the animal to form a sleeve are also provided. The garment applies pressure to the animal adequate to reduce anxiety, fearfulness, overexcitement, or a combination thereof in the animal.

In accordance with another embodiment, a method of reducing anxiety, fearfulness, overexcitement, or a combination thereof, in an animal is provided. The animal has a first pair of appendages and a second pair of appendages, with a mid-body between the first pair of appendages and the second pair of appendages. The method includes placing a garment on the mid-body of the animal. The garment includes a central portion, a first flap, and a second flap. The central portion has a longitudinal axis and a front end, a first side extending laterally in a first direction from the longitudinal axis, and a second side extending laterally in a second direction from the longitudinal axis in a direction opposite the first direction. The first flap extends from the first side of the central portion, and the second flap extends from the second side of the central portion. The method further includes wrapping the first flap under the animal's chest, stomach, or a combination thereof to overlap the second flap. The first flap is secured to the second flap such that the garment applies pressure to the animal adequate to reduce anxiety, fearfulness, overexcitement, or a combination thereof in the animal.

BRIEF DESCRIPTION OF THE DRAWINGS

For a more complete understanding of embodiments of a pressure-applying garment for animals and associated methods, reference should now be had to the embodiments shown in the accompanying drawings and described below. In the drawings:

FIG. 5 is bottom plan view of the embodiment of FIG. 4.

DESCRIPTION

Certain terminology is used herein for convenience only and is not to be taken as a limitation on the embodiments described. For example, words such as "top", "bottom", "front," "upper," "lower," "left," "right," "horizontal," "vertical," "upward," and "downward" merely describe the configuration shown in the figures. Indeed, the referenced components may be oriented in any direction and the terminology, therefore, should be understood as encompassing such variations unless specified otherwise. Throughout this disclosure, where a process or method is shown or described, the steps of the method may be performed in any order or simultaneously, unless it is clear from the context that one step depends on another being performed first.

Figure 1:
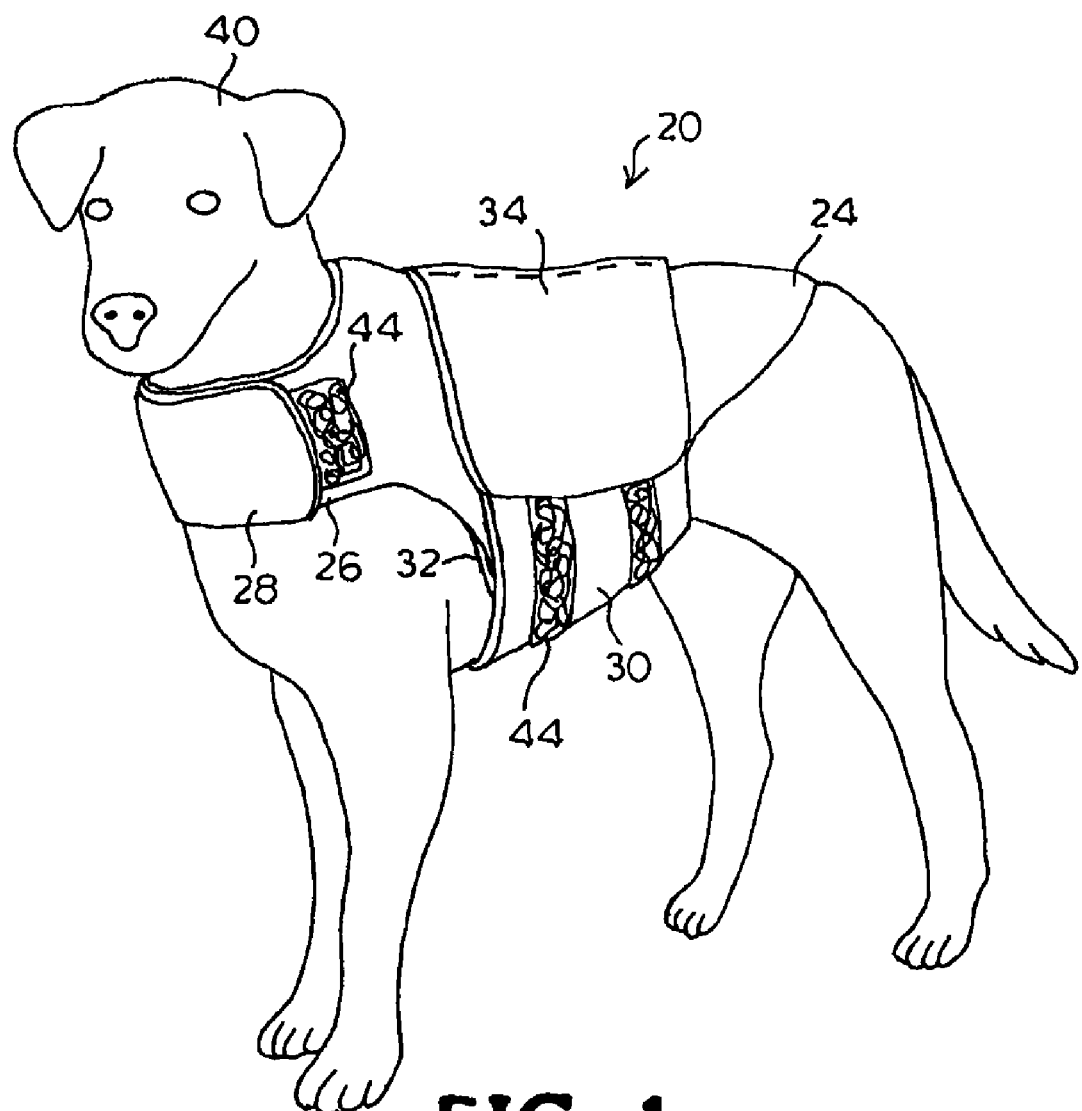
FIG. 1 is a perspective view of one embodiment of a pressure-applying garment as worn by an exemplary animal.
Figure 2:
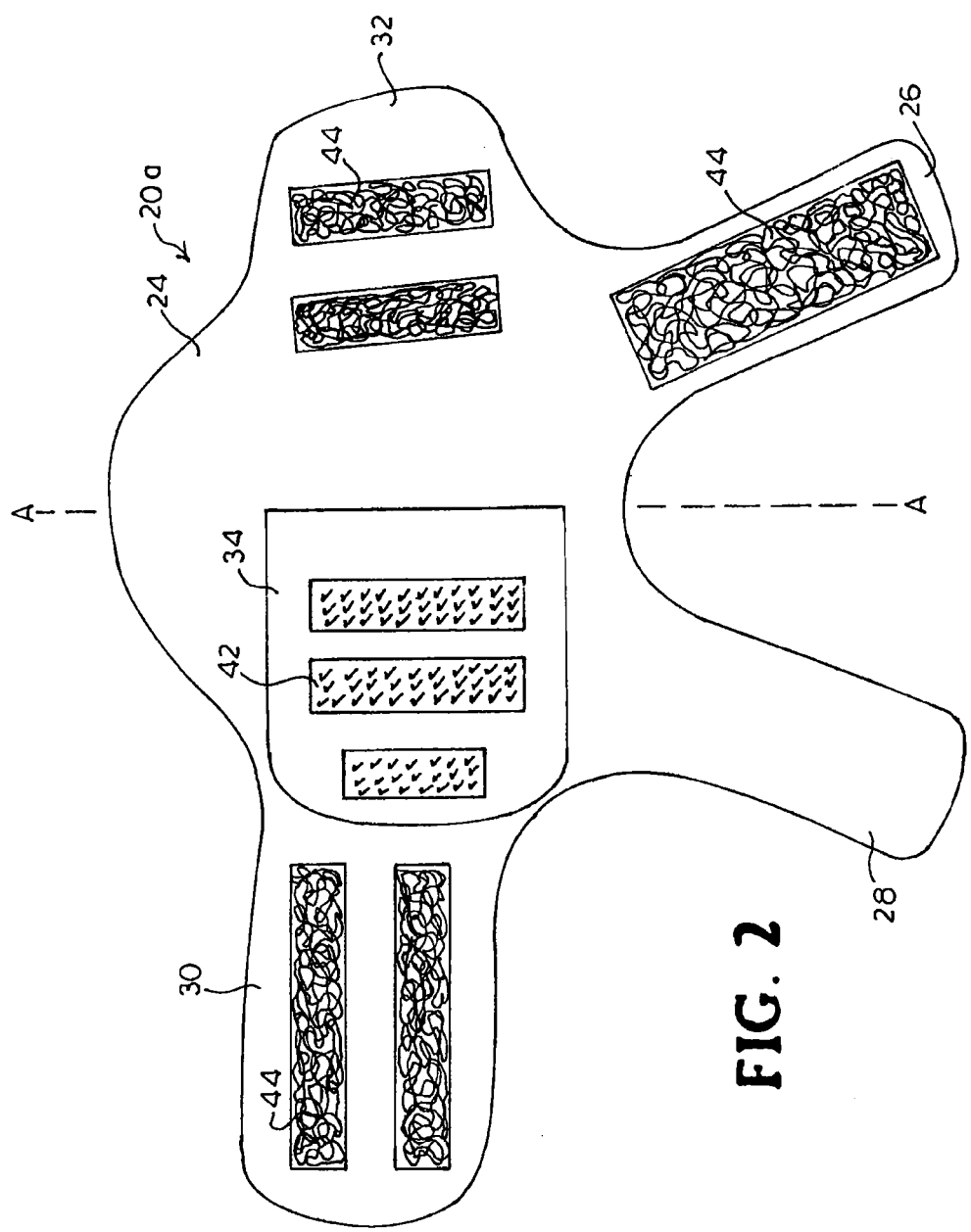
FIG. 2 is a top plan view of a first embodiment of the pressure-applying garment of FIG. 1.
Figure 3:
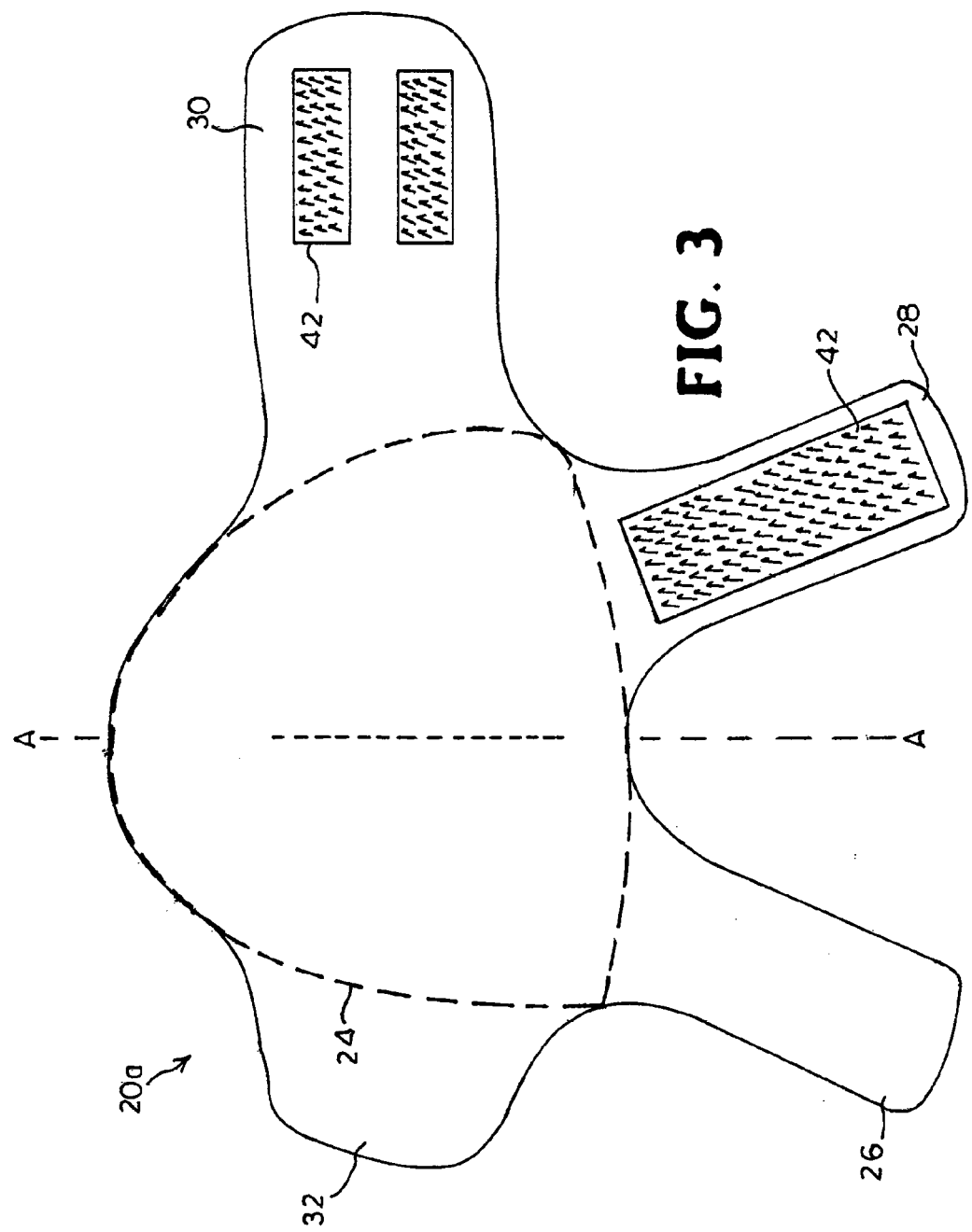
FIG. 3 is bottom plan view of the embodiment of FIG. 2.

Referring now to the drawings, wherein like reference numerals designate corresponding or similar elements throughout the several views, an embodiment of a pressure wrap garment 20 is shown in FIGS. 1-3. Although in FIG. 1 the garment is shown on a dog, the garment 20 may be applied to nearly any type of animal with four legs, or two arms and two legs. For example, in addition to a dog, the garment 20 may be worn by a cat or a monkey. This embodiment of the garment 20, 20a includes a central portion 24 having a longitudinal axis A-A, a left strap 26 and a right strap 28 extending from the front of the central portion 24 approximately parallel to the longitudinal axis A-A, a long flap 30 extending from the right side of the central portion 24 substantially perpendicular to the longitudinal axis A-A, a short flap 32 extending from the left side of the central portion 24 substantially perpendicular to the longitudinal axis A-A, and a top flap or cinching member 34 that is attached to the central portion 24 substantially along a longitudinal axis A-A of the central portion. The top of the garment 20a is shown in FIG. 2, and the bottom of the garment 20a is shown in FIG. 3. As worn by a dog 40, the left strap 26 and the right strap 28 go around the dog's neck and fasten to each other, with the bottom of the right strap 28 going over the top of the left strap 26. The long flap 30 goes around the dog's chest and stomach to fasten to the short flap 32, with the bottom of the long flap 30 going over the top of the short flap 32. The cinching member 34 folds down to fasten to the top of the long flap 30. Alternatively, the cinching member 34 could fold down to fasten to the central portion 24.

In the embodiment shown, hook and loop fasteners, such as Velcro® (VELCRO is a registered trademark of Velcro Industries B.V.), are used to removably attach the parts of the garment to each other. The hook material is designated at 42, and the loop material is designated at 44, but the materials may be switched so long as a hook surface meets a loop surface when the material is brought together. Other fasteners may be used as recognized by one of ordinary skill in the art, such as a series of buttons or snaps, or a combination of webbed straps and clips.

Figure 4:
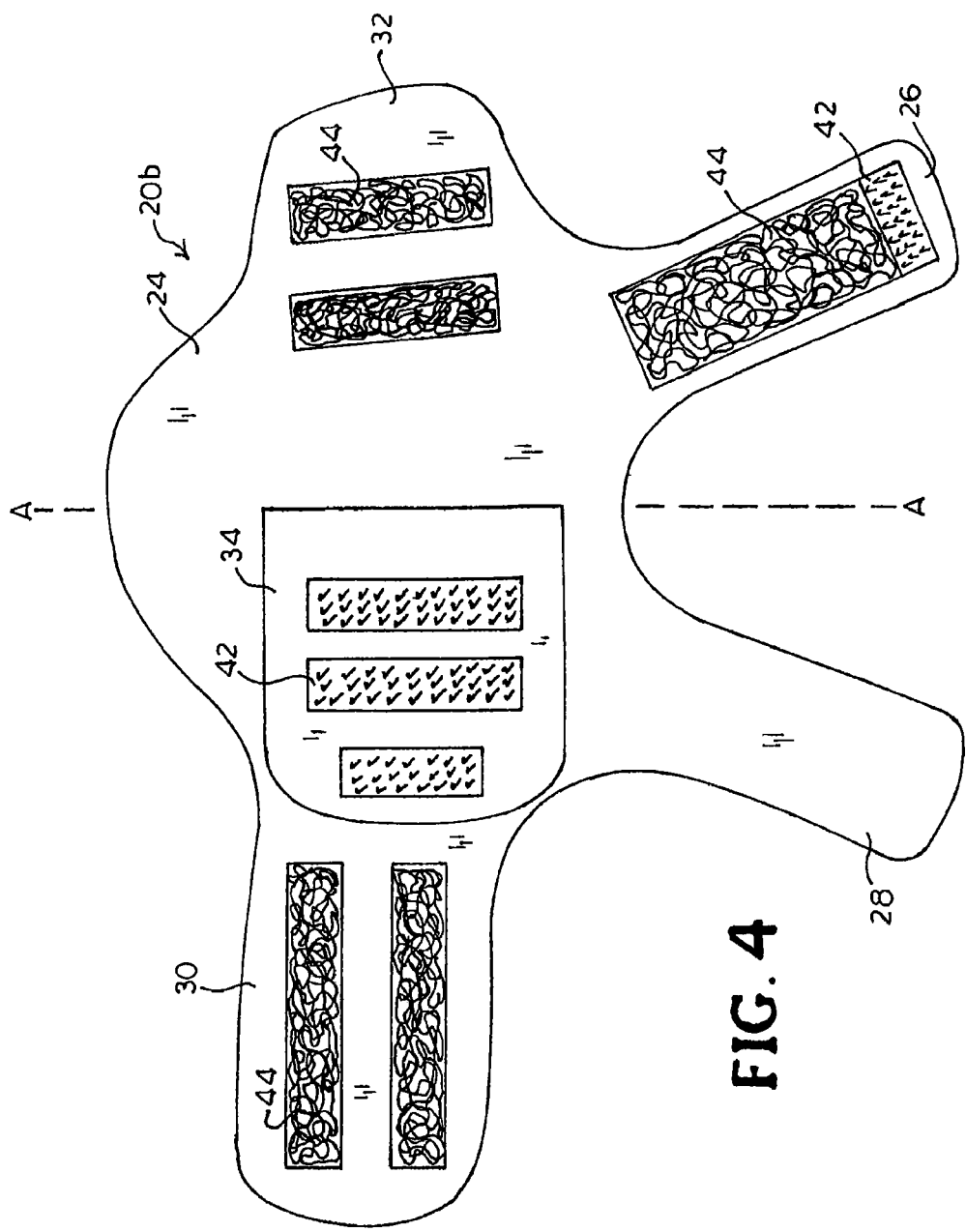
FIG. 4 is a top plan view of a second embodiment of the pressure-applying garment of FIG. 1.

FIGS. 4 and 5 show another embodiment of a pressure-applying garment 20b. The garment 20b is constructed similarly to the garment 20a of FIGS. 2 and 3, but includes on the left strap 26 on the top surface (FIG. 4) a portion near the end of the strap that is hook material 42, while on the bottom surface (FIG. 5) of the right strap 28 a portion that is loop material 44. Including both materials 42, 44 on the mating straps assist in maintaining the straps around the animal's neck without sagging. The embodiments of the garments 20a, 20b of FIGS. 2 and 3 and FIGS. 4 and 5 are further embodiments of the garment 20 embodiment of FIG. 1.

The material used for the garment 20 may have a composition that ranges, for example, from 5% to 25% spandex. The remainder of the material may be or include, for example, cotton and polyester. In one embodiment, the fabric may be made of 10% spandex, 55% cotton, and 35% polyester, or may be made of material of approximately that composition. Other fabrics and combinations of materials may be used as recognized by one of ordinary skill in the art, so long as the material exhibits a degree of elasticity that provides an expandable and flexible, yet snug, fit with pressure adequate to relieve anxiety, fearfulness, overexcitement, or a combination thereof, in the animal, and resilience that allows the material to return approximately to its original size when removed from the animal. In the embodiment of FIGS. 1-3, the central portion 24, straps 26, 28, long flap 30, and short flap 32 are made of one piece of material, with two layers sewn together continuously along the periphery. The cinching member 34 is sewn to the central portion 24 along one edge of the cinching member 34. One alternative configuration to the cinching member 34 may include the use of fabric straps, webbed straps, or elastic bands with clips or other connection means.

Figure 6A:
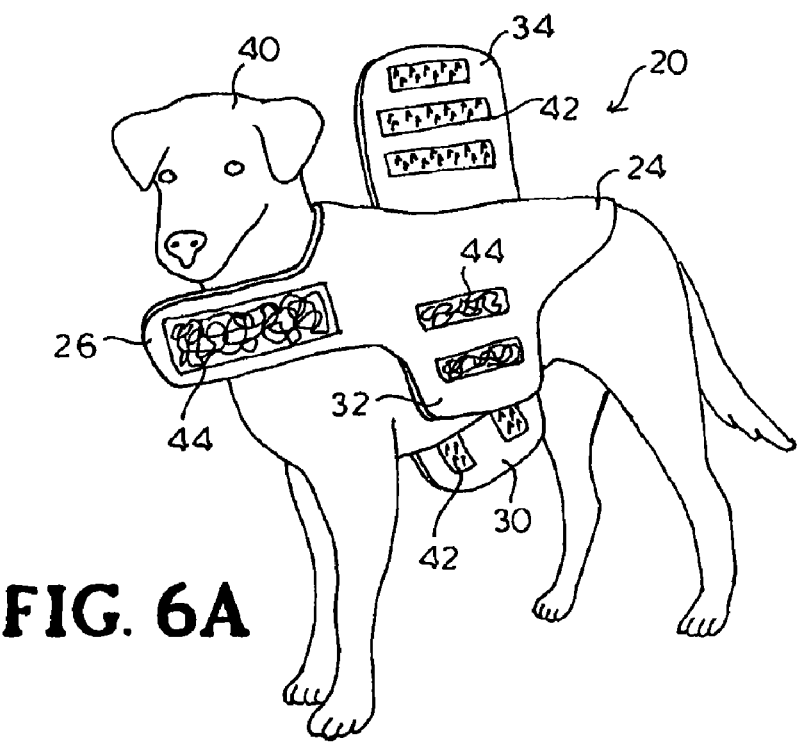
FIGS. 6A-6D are perspective views of the embodiment of FIG. 1 showing various stages of putting the garment on an exemplary animal.
Figure 6B:
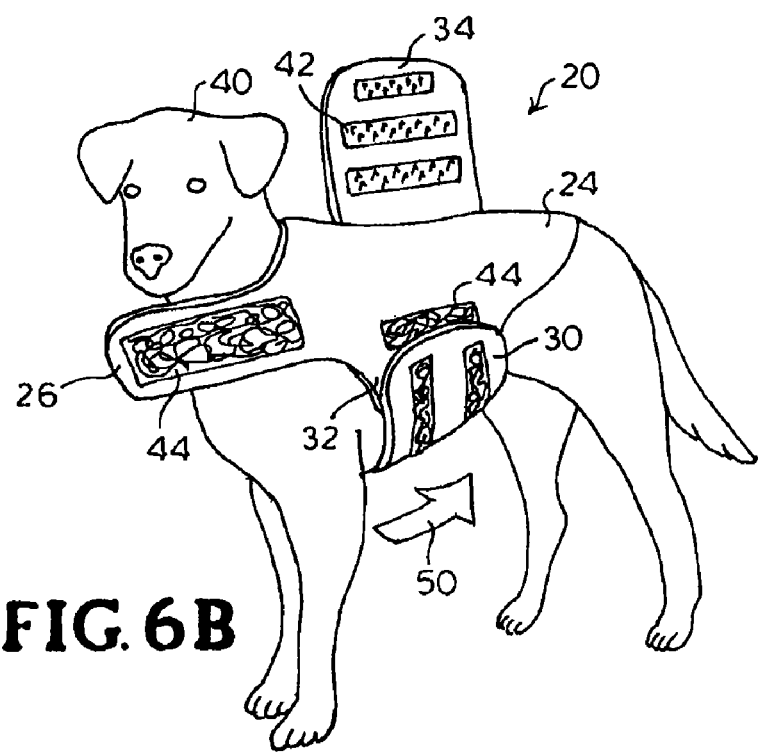
Figure 6C:
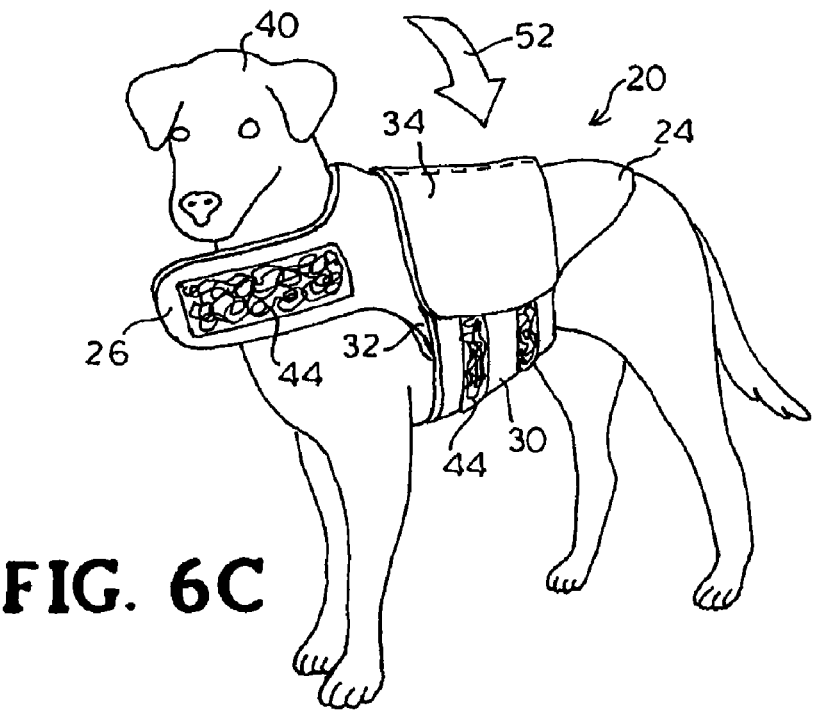
Figure 6D:
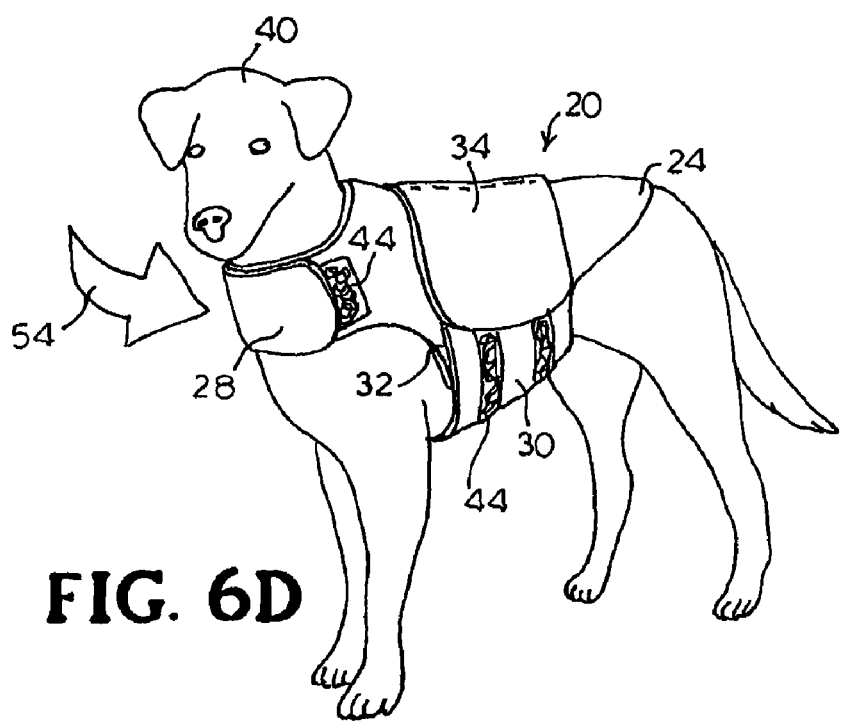

The garment 20 may be applied to an animal as shown in FIGS. 6A-6D. First, as shown in FIG. 6A, the garment 20 is placed on a back of the dog 40. Next, in FIG. 6B the long flap 30 is wrapped 50 under the dog's chest, stomach, and up the dog's left side and is secured with fasteners to the short flap 32 to achieve a comfortable, snug fit around the dog's mid-body, being the portion of the body between the dog's front and rear legs. The cinching member 34 is then wrapped 52 down onto the long flap 30 and is secured with fasteners in FIG. 6C, with some additional tension imparted on the garment to apply additional pressure to the dog, which will still be comfortable for the dog and give the dog a sense of security. As shown in FIG. 6D, the straps 26, 28 may then be wrapped 54 around the front of the dog 40 and secured with fasteners. If desired, the straps 26, 28 may be left attached when removing the garment 20 to save the step of fastening them the next time the garment 20 is put on the dog 40.

Although the embodiments described above have been shown and described in considerable detail with respect to only a few exemplary embodiments thereof, it should be understood by those skilled in the art that it is not intended to be limited to these embodiments since various modifications, omissions and additions may be made to the disclosed embodiments without materially departing from the novel teachings and advantages. The directions in which the flaps are folded could differ from those shown and the lengths of the flaps may vary. For example, the long flap 30 and the short flap 32 could be of equal length and fasten on top of the animal's back rather then on the lower side. The straps 26, 28, the cinching member 34, or both, may be omitted. Accordingly, it is intended to cover all such modifications, omission, additions and equivalents as may be included within the spirit and scope of a pressure-applying garment and associated methods as defined by the following claims. In the claims, means-plus-function clauses are intended to cover the structures described herein as performing the recited function and not only structural equivalents but also equivalent structures. Thus, although a nail and a screw may not be structural equivalents in that a nail employs a cylindrical surface to secure wooden parts together, whereas a screw employs a helical surface, in the environment of fastening wooden parts, a nail and a screw may be equivalent structures.

What is claimed is:

1. A garment for an animal having a first pair of appendages, a second pair of appendages, and a neck, the animal having a mid-body between the first pair of appendages and the second pair of appendages, the garment comprising:

a central portion having a longitudinal axis and including a front end, a rear end opposite the front end, a first side extending laterally in a first direction from the longitudinal axis and forming a portion of a perimeter of the garment, and a second side extending laterally in a second direction from the longitudinal axis and forming a portion of the perimeter of the garment, the second direction opposite the first direction;

a first flap extending in the first direction from the first side of the central portion, the first flap including a free distal end and two opposing edges that with the free distal end of the first flap form a portion of the perimeter of the garment;

a second flap extending in the second direction from the second side of the central portion, the second flap including a free distal end and two opposing edges that with the free distal end of the second flap form a portion of the perimeter of the garment;

a first strap extending from the front end of the central portion, the first strap including a free distal end and two opposing edges that with the free distal end of the first strap form a portion of the perimeter of the garment; and a second strap extending from the front end of the central portion laterally spaced in the second direction from the first strap, the second strap including a free distal end and two opposing edges that with the free distal end of the second strap form a portion of the perimeter of the garment, wherein when the garment is worn by an animal the first flap and the second flap extend around the mid-body of the animal and fasten to each other such that the central portion and fastened first and second flaps form a shape conforming to the outside of the mid-body of the animal, and the front end of the central portion is positioned proximate to the head of the animal, wherein the first strap and the second strap each have an inside surface adapted to contact the animal and an outside surface adapted to face away from the animal, wherein the first strap and the second strap are extendible around the neck of the animal and fasten to each other with hook and loop fasteners, wherein the inside surface of the first strap includes a hook section of fastener and a loop section of fastener, and wherein the outside surface of the second strap includes a hook section of fastener and a loop section of fastener, and wherein the garment, when worn, applies pressure to the animal adequate to reduce anxiety, fearfulness, overexcitement, or a combination thereof in the animal.

2. The garment of claim 1, further comprising a cinching flap having a proximate end attached to the central portion, the first flap, or the second flap and extending to a free distal end, and wherein the cinching flap extends at least partially around the shape formed by the central portion and the fastened first and second flaps that conforms to the mid-body of the animal and fastens to the central portion, the first flap, the second flap, or a combination thereof to further tighten the garment to apply pressure to the animal.

3. The garment of claim 2, wherein the proximate end of the cinching flap is attached generally along the longitudinal axis of the central portion.

4. The garment of claim 2, wherein the central portion, the first flap, the second flap, and the cinching flap comprise a fabric that when stretched provides resiliency adequate to reduce anxiety, fearfulness, overexcitement, or a combination thereof in the animal.

5. The garment of claim 2, wherein the central portion, the first flap, the second flap, and the cinching flap comprise a fabric comprising from approximately 5% to 25% spandex.

6. The garment of claim 2, wherein the central portion, the first flap, the second flap, and the cinching flap comprise a fabric comprising approximately 10% spandex, 55% cotton, and 35% polyester.

7. The garment of claim 2, wherein when the cinching flap is fastened to the central portion, the first flap, the second flap, or a combination thereof, the cinching flap overlaps and covers the free distal end of the first flap.

8. The garment of claim 1, wherein the hook section of fastener on the inside surface of the first strap is interposed between the free distal end of the first strap and the loop section of fastener on the inside surface of the first strap, and wherein the hook section of fastener on the outside surface of the second strap is interposed between the free distal end of the second strap and the loop section of fastener on the outside surface of the first strap.

9. A garment for an animal having a first pair of appendages, a second pair of appendages, and a neck, the animal having a mid-body between the first pair of appendages and the second pair of appendages, the garment comprising:
- a central portion having a longitudinal axis and including a front end, a rear end opposite the front end, a first side extending laterally in a first direction from the longitudinal axis and forming a portion of a perimeter of the garment, and a second side extending laterally in a second direction from the longitudinal axis and forming a portion of the perimeter of the garment, the second direction opposite the first direction;
- a first flap extending in the first direction from the first side of the central portion, the first flap including a free distal end and two opposing edges that with the free distal end of the first flap form a portion of the perimeter of the garment;
- a second flap extending in the second direction from the second side of the central portion, the second flap including a free distal end and two opposing edges that with the free distal end of the second flap form a portion of the perimeter of the garment;
- a first strap extending from the front end of the central portion, the first strap including a free distal end and two opposing edges that with the free distal end of the first strap form a portion of the perimeter of the garment;
- a second strap extending from the front end of the central portion laterally spaced in the second direction from the first strap, the second strap including a free distal end and two opposing edges that with the free distal end of the second strap form a portion of the perimeter of the garment; and
- a cinching flap having a proximate end attached to the central portion, the first flap, or the second flap and extending to a free distal end, wherein when the garment is worn by an animal the first flap and the second flap extend around the mid-body of the animal and fasten to each other such that the central portion and fastened first and second flaps form a shape conforming to the outside of the mid-body of the animal, and the cinching flap extends at least partially around the shape formed by the central portion and the fastened first and second flaps that conforms to the mid-body of the animal and fastens to the central portion, the first flap, the second flap, or a combination thereof, and the front end of the central portion is positioned proximate to the head of the animal, wherein the first strap and the second strap each have an inside surface adapted to contact the animal and an outside surface adapted to face away from the animal, wherein the first strap and the second strap are extendible around the neck of the animal and fasten to each other with hook and loop fasteners, wherein the inside surface of the first strap includes a hook section of fastener and a loop section of fastener, and wherein the outside surface of the second strap includes a hook section of fastener and a loop section of fastener, and the garment, when worn, applies pressure to the animal.

10. The garment of claim 9, wherein the proximate end of the cinching flap is attached generally along the longitudinal axis of the central portion.

11. The garment of claim 9, wherein the garment applies pressure to the animal adequate to reduce anxiety, fearfulness, overexcitement, or a combination thereof in the animal.

12. The garment of claim 9, wherein the central portion, the first flap, the second flap, and the cinching flap comprise a fabric comprising from approximately 5% to 25% spandex.

13. The garment of claim 9, wherein the hook section of fastener on the inside surface of the first strap is interposed between the free distal end of the first strap and the loop section of fastener on the inside surface of the first strap, and wherein the hook section of fastener on the outside surface of the second strap is interposed between the free distal end of the second strap and the loop section of fastener on the outside surface of the first strap.

14. The garment of claim 9, wherein when the cinching flap is fastened to the central portion, the first flap, the second flap, or a combination thereof, the cinching flap overlaps and covers the free distal end of the first flap.

15. The garment of claim 9, wherein each of the first flap, the second flap, and the cinching flap has inside surfaces adapted to be adjacent to the animal, and outside surfaces opposite the inside surfaces adapted to face away from the animal, wherein the second flap outside surface includes at least one first strip oriented in a first direction of one of hook fasteners or loop fasteners, and the first flap inside surface includes at least one second strip oriented in a second direction of the other of hook fasteners or loop fasteners, wherein when the first flap overlaps the second flap, the first strip and the second strip are substantially perpendicular to each other such that the first flap is fastened to the second flap.

16. The garment of claim 9, wherein each of the first flap, the second flap, and the cinching flap has inside surfaces adapted to be adjacent to the animal, and outside surfaces opposite the inside surfaces adapted to face away from the animal, wherein the first flap outside surface includes at least one first strip oriented in a first direction of one of hook fasteners or loop fasteners, and the cinching flap inside surface includes at least one second strip oriented in a second direction of the other of hook fasteners or loop fasteners, wherein when the cinching flap overlaps the first flap, the first strip and the second strip are substantially perpendicular to each other such that the first flap is fastened to the second flap.

* * * * *